US010497095B2

(12) United States Patent
Xiong et al.

(10) Patent No.: US 10,497,095 B2
(45) Date of Patent: Dec. 3, 2019

(54) DUAL-SENSOR HYPERSPECTRAL MOTION IMAGING SYSTEM

(71) Applicant: MICROSOFT TECHNOLOGY LICENSING, LLC, Redmond, WA (US)

(72) Inventors: Zhiwei Xiong, Redmond, WA (US); Lizhi Wang, Redmond, WA (US); Wenjun Zeng, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 30 days.

(21) Appl. No.: 15/575,756

(22) PCT Filed: May 18, 2016

(86) PCT No.: PCT/US2016/032940
§ 371 (c)(1),
(2) Date: Nov. 20, 2017

(87) PCT Pub. No.: WO2016/191157
PCT Pub. Date: Dec. 1, 2016

(65) Prior Publication Data
US 2018/0182069 A1  Jun. 28, 2018

Related U.S. Application Data

(63) Continuation of application No. PCT/CN2015/079559, filed on May 22, 2015.

(30) Foreign Application Priority Data

Jun. 11, 2015 (CN) .......................... 2015 1 0320404

(51) Int. Cl.
*G06T 3/40* (2006.01)
*G06T 5/50* (2006.01)

(52) U.S. Cl.
CPC .............. *G06T 3/4061* (2013.01); *G06T 5/50* (2013.01); *G06T 2207/10016* (2013.01);
(Continued)

(58) Field of Classification Search
CPC ...................... G06T 3/4061; G06T 5/50; G06T 2207/10016; G06T 2207/10036; G06T 2207/10041; G06T 2207/20081
(Continued)

(56) References Cited

U.S. PATENT DOCUMENTS

2005/0100220 A1* 5/2005 Keaton ................ G06K 9/0063
382/191

FOREIGN PATENT DOCUMENTS

| CN | 101916435 A | 12/2010 |
|---|---|---|
| CN | 103471715 A | 12/2013 |
| CN | 104156911 A | 11/2014 |

OTHER PUBLICATIONS

"First Office Action and Search Report Issued in Chinese Patent Application No. 201510320404.3", dated Jul. 27, 2018, 15 Pages.
(Continued)

*Primary Examiner* — Daniel G Mariam
(74) *Attorney, Agent, or Firm* — Merchant & Gould P.C.

(57) ABSTRACT

High-speed hyperspectral (HSHS) video reconstruction is implemented in an imaging system. A hyperspectral snapshot is determined. A panchromatic video is determined corresponding to a frame time of the hyperspectral snapshot, the panchromatic video including a plurality of panchromatic frames. An HSHS video is generated by building a patch dictionary based at least in part on the panchromatic video and generating at least one frame of the HSHS video based at least in part on the patch dictionary, the panchromatic video, and the hyperspectral snapshot. A computing device can include a dictionary component configured to determine the patch dictionary and a reconstruction component configured to generate at least one HSHS frame based at least in part on the patch dictionary, the panchromatic video, and the hyperspectral snapshot.

20 Claims, 6 Drawing Sheets

(52) U.S. Cl.
CPC .............. *G06T 2207/10036* (2013.01); *G06T 2207/10041* (2013.01); *G06T 2207/20081* (2013.01)

(58) Field of Classification Search
USPC ......................................................... 382/159
See application file for complete search history.

(56) References Cited

OTHER PUBLICATIONS

Liu, et al., "Efficient Space-Time Sampling with Pixel-Wise Coded Exposure for High-Speed Imaging", In IEEE Transactions on Pattern Analysis and Machine Intelligence, vol. 36, Issue 2, Jul. 2, 2013, 14 Pages.

Ma, et al., "Acquisition of High Spatial and Spectral Resolution Video with a Hybrid Camera System", In Proceedings of International Journal of Computer Vision, vol. 110, Issue2, Nov. 13, 2014, pp. 141-155.

"International Preliminary Report on Patentability Issued in PCT Application No. PCT/US2016/032940", dated Mar. 20, 2017, 9 Pages.

"International Search Report & Written Opinion Issued in PCT Application No. PCT/US2016/032940", dated Aug. 9, 2016, 12 Pages.

Wang, et al., "Dual-Camera Design for Coded Aperture Snapshot Spectral Imaging", In Journal of Applied Optics, vol. 54, Issue 4, Feb. 1, 2015, pp. 848-858.

Wang, et al., "High-speed Hyperspectral Video Acquisition With a Dual-Camera Architecture", In Proceedings of the IEEE Conference on Computer Vision and Pattern Recognition, Jun. 7, 2015, pp. 4942-4950.

Ye, et al., "Panchromatic Image Based Dictionary Lerning for Hyperspectral Imagery Denoising", In Proceedings of IEEE International Geoscience and Remote Sensing Symposium, Jul. 21, 2013, pp. 4130-4133.

Zhao, et al., "Hyperspectral Imagery Super-Resolution by Image Fusion and Compressed Sensing", In IEEE International Geoscience and Remote Sensing Symposium, Jul. 22, 2012, 3 Pages.

"Second Written Opinion Issued in PCT Application No. PCT/US2016/032940", dated Nov. 21, 2016, 5 Pages.

"Office Action Issued in Chinese Patent Application No. 201510320404.3", dated Apr. 9, 2019, 10 Pages.

* cited by examiner

US 10,497,095 B2

DUAL-SENSOR HYPERSPECTRAL MOTION IMAGING SYSTEM

CROSS-REFERENCE TO RELATED APPLICATION

This application is a U.S. National Stage Application of PCT/US2016/032940, filed May 18, 2016, which claims priority to International Patent Application No. PCT/CN2015/079559, filed May 22, 2015 and Chinese Patent Application No. 201510320404.3, filed Jun. 11, 2015, which applications are hereby incorporated by reference. To the extent appropriate, a claim of priority is made to the above disclosed applications.

BACKGROUND

Conventional digital images and videos are captured using single-channel (e.g., grayscale) sensors or using three-channel (e.g., red, green, blue) sensors. "Hyperspectral" (or "multispectral") digital images and videos are captured using spectrometers or other devices that provide more than three channels of information, each corresponding to a respective range ("passband") of wavelengths, or that provide information over a broad spectral passband such as the visible spectrum (e.g., 400-700 nm). Hyperspectral images are not restricted to the visible spectrum, but can also include passbands in, e.g., the infrared (>700 nm) or ultraviolet (<400 nm) ranges.

In some existing hyperspectral imaging systems, a spectrometer is used to measure the spectrum of light corresponding to each imaging pixel, e.g., successively in a raster pattern. In some existing hyperspectral imaging systems, successive exposures are taken of a scene, one exposure for each passband.

SUMMARY

High-speed hyperspectral (HSHS) video is described herein. A panchromatic video and a hyperspectral snapshot are processed to generate frame(s) of the HSHS video. For example, the HSHS video can include frames at a higher frame rate than the hyperspectral snapshot. In some examples, a dictionary component builds a patch dictionary based at least in part on the panchromatic video. A reconstruction component determines HSHS frame(s) based at least in part on the patch dictionary, the panchromatic video, and the hyperspectral snapshot.

BRIEF DESCRIPTION OF THE DRAWINGS

The same numbers are used throughout the drawings to reference like features and components.

DETAILED DESCRIPTION

The following discussion is directed to generating high-speed hyperspectral (HSHS) video data. Rather than assembling an HSHS video solely from hyperspectral data captures, in the described example embodiments, HSHS video is provided by combining hyperspectral information and single-band (e.g., broad-band, herein "panchromatic") information. In some examples, panchromatic video frames have a shorter frame time than the hyperspectral imager or other capture device. Various aspects provide higher light-utilization efficiency than prior schemes. Various aspects train a patch dictionary based on panchromatic information and use the dictionary to efficiently reconstruct the HSHS video using compressive sensing techniques.

Figure 1:
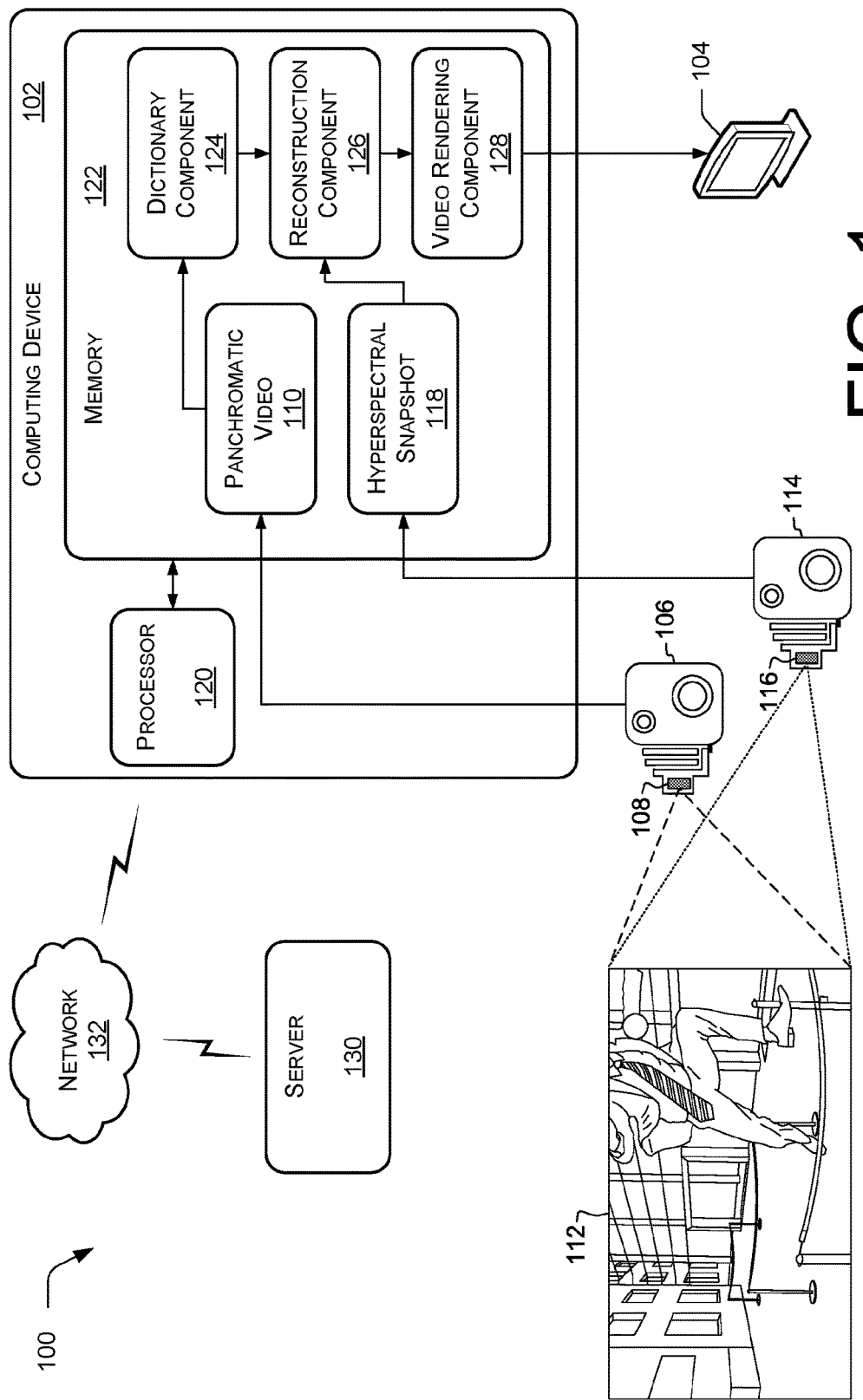
FIG. 1 is a block diagram of an example environment in which high-speed hyperspectral video imaging is implemented.

FIG. 1 illustrates an example environment 100 in which HSHS video is processed. In the illustrated example, environment 100 includes a computing device 102, which can include, or be communicatively coupled to, a display device 104. Computing device 102 represents any type of device that can receive and process video content. Computing device 102 can be implemented as, for example, but without limitation, an Internet-enabled television, a television set-top box, a game console, a desktop computer, a laptop computer, a tablet computer, or a smartphone.

In the illustrated example, computing device 102 includes, or is communicatively connected with, a panchromatic imager 106, depicted as a camera. As used herein, the term "panchromatic" refers to an imager or sensor that is sensitive to wavelengths over a selected range. In some examples, this range encompasses one or more spectral passbands, as described below. Panchromatic imager 106 can include one or more panchromatic sensors(s) 108 or other systems configured to capture or otherwise provide a panchromatic video 110 or data that can be processed to provide panchromatic video 110. In the illustrated example, panchromatic imager 106 provides panchromatic video 110 of a scene 112. In this example, scene 112 includes a person jumping over a hurdle. This example scene 112 is for purposes of illustration and is not limiting.

Example panchromatic sensors 108 can include front- and rear-facing cameras of a smartphone, a light sensor (e.g., a CdS photoresistor or a phototransistor), a still imager (e.g., a charge-coupled device (CCD), a complementary metal-oxide-semiconductor (CMOS) sensor, etc.), a video imager (e.g., CCD or CMOS), a fingerprint reader, a retinal scanner, an iris scanner, a computed-radiography scanner, or the like. Panchromatic sensor 108 can include, e.g., a CCD or CMOS sensor with no Bayer or other color-filter array, or with a color-filter array having substantially the same spectral transmittance for each pixel of the sensor.

In the illustrated example, computing device 102 includes, or is communicatively connected with, a hyperspectral imager 114, depicted as a camera, and including one or more hyperspectral sensor(s) 116 configured to capture or otherwise provide a hyperspectral snapshot 118 of scene 112 or data that can be processed to provide hyperspectral snapshot 118. In some examples, hyperspectral snapshot 118 includes data of one or more spectral passbands. In some examples, hyperspectral snapshot 118 includes coded data, e.g., output by a detector such as those discussed below with reference to FIG. 6. As used herein, a hyperspectral imager 114 that provides data over a broad spectral range, e.g., the visible range, or a range >100 nm wide, or 200 nm wide, is considered to have a large number of small spectral passbands, e.g., 1 nm wide. For example, references to more than three channels of hyperspectral imagery include imagery provided by such a broad-band imager.

For example, hyperspectral sensor 116 can include one or more sensors of types described above with respect to panchromatic sensor 108, e.g., CCD or CMOS sensors.

Hyperspectral sensor 116 can include, e.g., one or more color filter arrays including filters of respective, different spectral transmittances corresponding to respective, different pixels of a CCD or CMOS sensor.

In some examples, hyperspectral imager 114 is, or includes, a snapshot spectral imager. Example snapshot spectral imagers can include, without limitation, coded aperture snapshot spectral imagers (CASSI) with double diffusers (DD-CASSI) or single diffusers (SD-CASSI). These and other snapshot spectral imagers have the ability to recover a full hyperspectral image with a single "shot" (exposure).

In some examples, hyperspectral imager 114 is, or includes, a dual-coded compressive hyperspectral imager (DCSI) that uses spatial light modulators to modulate the incoming light so that a sensor can capture a hyperspectral snapshot. In some examples, hyperspectral imager 114 is, or includes, a CASSI, which can include one or more dispersers and a coded aperture to optically encode three-dimensional (3-D) spatiospectral information onto a two-dimensional (2-D) detector. A full hyperspectral image can be recovered through computational reconstruction using compressive sensing techniques. Further details of a CASSI-based snapshot hyperspectral imager 114 are described below with reference to FIG. 6. In some examples, hyperspectral imager 114 is, or includes, a spatial-spectral encoded compressive hyperspectral imager (SSCSI), similar to a CASSI but with the disperser and coded aperture in the opposite relative order.

In some examples, panchromatic imager 106 and hyperspectral imager 114 view scene 112 through a beam splitter (not shown). Examples of such configurations are discussed below with reference to FIG. 6. In some examples, panchromatic imager 106 and hyperspectral imager 114 view scene 112 along respective, different optical paths, e.g., along paths separated by less than 10° or less than 5°.

Computing device 102 includes at least one processor 120 and a memory 122 configured to store the panchromatic video 110 and the hyperspectral snapshot 118. Memory 122 can also store one or more of a dictionary component 124, a reconstruction component 126, and a video rendering component 128 stored in the memory 122 and executable on the at least one processor 120.

Dictionary component 124 can be configured to determine a patch dictionary based at least in part on the panchromatic video 110, e.g., a captured or stored panchromatic video 110. Reconstruction component 126 can be configured to determine at least one frame of a high-speed hyperspectral (HSHS) video based at least in part on the patch dictionary, the panchromatic video 110, and the hyperspectral snapshot 118. Video rendering component 128 can be configured to render at least a part of the HSHS video for display via the display device 104.

In the illustrated example environment 100, dictionary component 124, reconstruction component 126, and video rendering component 128 can each be components of an operating system (not shown) or otherwise stored or executed locally on computing device 102. However, in other examples one or more of the system components can be implemented as part of a distributed system, for example, as part of a cloud-based service or as components of another application. In some examples, processor 120 can communicate with a server 130 via a network 132, such as the Internet. Server 130 can host one or more of dictionary component 124, reconstruction component 126, and video rendering component 128, and can exchange data with computing device 102 via network 132 to perform processing described herein. Network 132 can include a cable television network, radio frequency (RF), microwave, satellite, and/or data network, such as the Internet, and can also support wired or wireless media using any format and/or protocol, such as broadcast, unicast, or multicast. Additionally, network 132 can be any type of network, wired or wireless, using any type of network topology and any network communication protocol, and can be represented or otherwise implemented as a combination of two or more networks.

Figure 2:
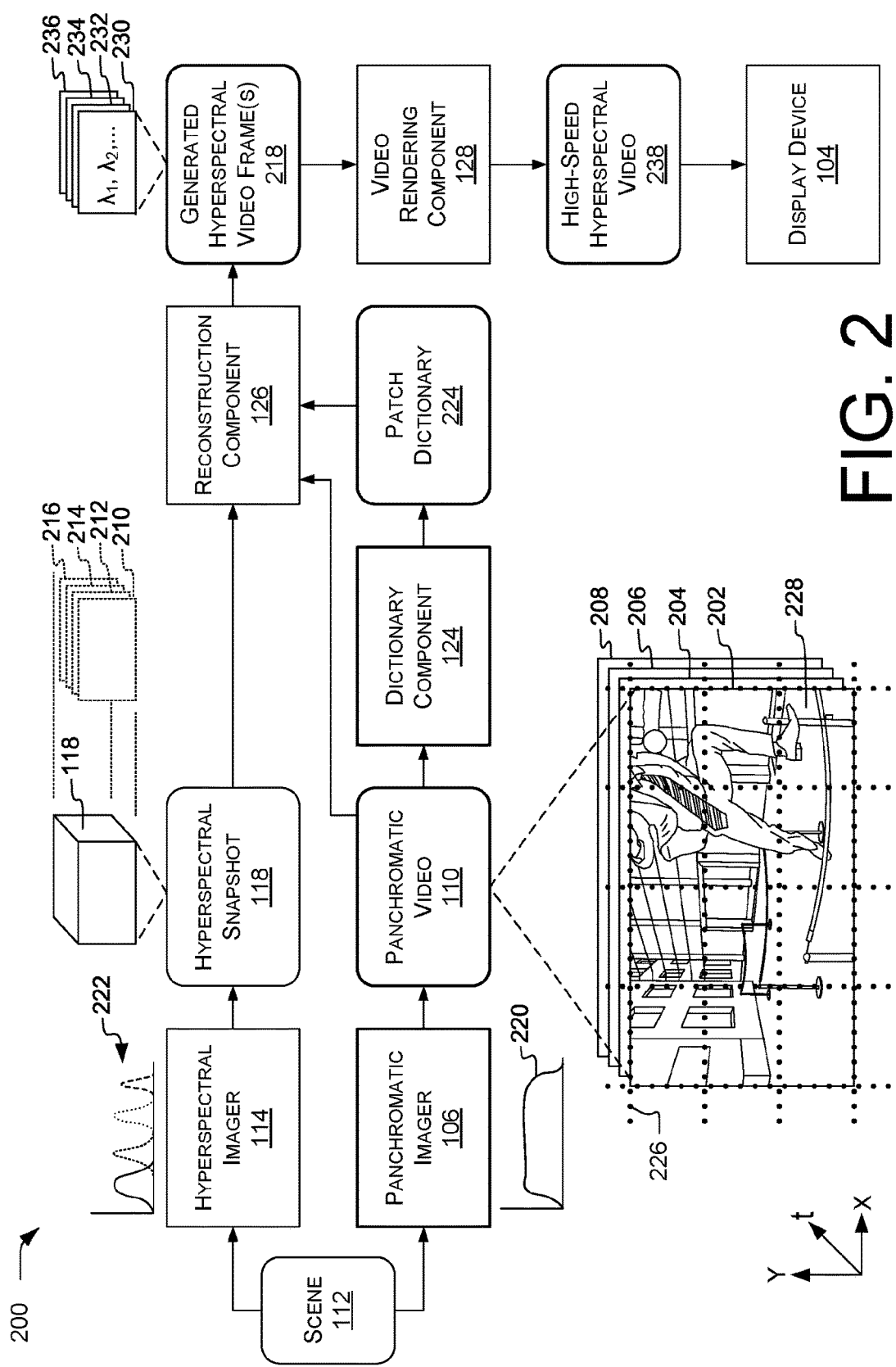
FIG. 2 is a block diagram illustrating example data flow for high-speed hyperspectral imaging.

FIG. 2 illustrates an example data flow 200 for high-speed hyperspectral imaging. In FIG. 2, snapshots, videos, and image frames are graphically represented with X and Y spatial dimensions horizontally and vertically, and time increasing into the plane of the figure, along the "t" axis. In the illustrated example, panchromatic imager 106 and hyperspectral imager 114 image scene 112, e.g., concurrently. Panchromatic imager 106 provides panchromatic video 110 and hyperspectral imager 114 provides hyperspectral snapshot 118. Four illustrative frames 202, 204, 206, and 208 of panchromatic video 110 are shown and include image content representing scene 112 at respective, different times (represented by their spacing on the diagonal "t" axis). In some examples, panchromatic video 110 corresponds to a frame time of hyperspectral snapshot 118. As used herein, "frame time," e.g., in seconds(s), refers to the inverse of frame rate, and "frame rate," e.g., in hertz ($s^{-1}$), refers to the number of frames an imager can output in a given amount of time, e.g., 1 s, when operated continuously under selected conditions. Frame rates can be fractional, e.g., for a 400 ms frame time, corresponding to a frame rate of 2.5 $s^{-1}$ (2.5 Hz). Frame rate can be determined, for example, by an imager or the electronics driving that imager.

In the example shown, the frame time of one hyperspectral snapshot 118 corresponds to four captured panchromatic frames 202-208. In this example, the frame time of hyperspectral snapshot 118 includes frame times 210, 212, 214, and 216 corresponding respectively to panchromatic frames 202, 204, 206, and 208. High-speed hyperspectral (HSHS) video frames can be reconstructed as generated hyperspectral video frame(s) 218, as described below. Individual hyperspectral video frames 218 can include data for one or more spectral passbands. For example, curves 222 depict four passbands, in one nonlimiting example. One hyperspectral snapshot 118 can include data for all four of those passbands. Alternatively, one hyperspectral snapshot 118 can include data for one or more of the spectral passbands, or fewer than all spectral passbands, of hyperspectral imager 114. In some examples, one or more of the generated hyperspectral video frame(s) 218 include(s) data for a plurality of spectral passbands (graphically represented as). In some examples, hyperspectral snapshot 118 can include data for one or more, two or more, three or more, four or more, more than three, or more than four spectral passbands. In some examples, one or more of the generated hyperspectral video frame(s) 218 can include data for one or more, two or more, three or more, four or more, more than three, or more than four spectral passbands.

In some examples, hyperspectral imager 114 is operated synchronously with respect to panchromatic imager 106. This does not require that hyperspectral imager 114 and panchromatic imager 106 are triggered at exactly the same time, but only that their exposure times are coordinated. For example, panchromatic imager 106 can be configured to capture a plurality of frames 202-208 of panchromatic video 110 during a frame time of hyperspectral imager 114, as noted above. A frame time can commence, e.g., immediately after an imager completes output of one frame, and extend until that imager completes output of the next frame. Frame times can alternatively commence when an imager begins output of one frame or when an imager begins or ends capture of one frame and extend to the corresponding event for the next frame.

In some examples, panchromatic imager 106 captures frames at times $t=\tau_p i$ for panchromatic frame time $\tau_p$ and integers $i \geq 0$. In this example, $t=0$ is defined with reference to panchromatic imager 106. In this example, hyperspectral imager 114 captures hyperspectral snapshots 118 at times $t=\tau_h i+\phi_h$ for hyperspectral frame time $\tau_h$ and hyperspectral phase $\phi_h$ in seconds with respect to the timebase t defined in relation to panchromatic imager 106. Hyperspectral phase can also be expressed in degrees as $(\phi_h/\tau_p) \times 360°$. In an example, $\phi_h \approx 0$ and $\tau_h = K\tau_p$, in which case K can be referred to as an "acceleration rate" representing the higher speed of panchromatic imager 106 with respect to hyperspectral imager 114.

Curve 220 graphically represents an example spectral passband of the panchromatic imager 106. The X axis represents frequency and the Y axis represents percent transmittance (% T), e.g., in luminous or radiant units. Curves 222 (shown with four different line patterns) represent four spectral passbands of hyperspectral imager 114 on the same axes and with the same horizontal scale as curve 220. In this example, hyperspectral imager 114 captures data corresponding to the one or more spectral passbands (curves 222) of the hyperspectral imager 114, and panchromatic imager 106 captures data corresponding to a spectral passband (curve 220) at least encompassing the one or more spectral passbands (curves 222) of the hyperspectral imager 114. As shown, the spectral passbands of hyperspectral imager 114 (curves 222) can overlap or be spaced apart, and can have respective, different peak % T values. Also as shown, the spectral passband of panchromatic imager 106 (curve 220) or passband(s) of hyperspectral imager 114 (curves 222) can have % T value(s) that vary across the passband. In some examples, at least part of one of the spectral passbands of hyperspectral imager 114 extends beyond a spectral passband of panchromatic imager 106, or beyond a point in a spectral passband of panchromatic imager 106 at which panchromatic imager 106 has 50% of a peak sensitivity of panchromatic imager 106. In some examples, hyperspectral snapshot 118 includes data for a plurality of spectral passbands, e.g., in a coded form as discussed below with reference to FIG. 6.

Dictionary component 124 builds or otherwise determines a patch dictionary 224 based at least in part on the panchromatic video 110. For example, dictionary component 124 can determine one or more dictionary patches of patch dictionary 224 based at least in part on pixel values or other image data of one or more pixels of one or more frames of panchromatic video 110. In some examples, dictionary component 124 can determine one or more of the dictionary patches in the patch dictionary based solely on the panchromatic video, i.e., not also based on or derived from hyperspectral snapshot 118.

Patch dictionary 224 can include multiple dictionary patches. Dictionary component 124 can determine the one or more dictionary patches based at least in part on one or more training patches. Individual ones of the training patches or dictionary patches can include pixel data of images or portions of images. For example, a particular training patch of the training patches can include respective samples multiple pixels high and multiple pixels wide taken from a plurality of the frames 202-208 of panchromatic video 110.

In the illustrated example, the captured panchromatic video 110 is divided spatially by boundaries 226, represented with heavy dotted lines over frame 202 of panchromatic video 110. A particular dictionary patch or training patch can include one or more samples from respective frames 202-208 of panchromatic video 110, e.g., delimited spatially by boundaries 226. In an example, one sample can include image content from spatial region 228 in some or all of frames 202, 204, 206, and 208, e.g., from a plurality of consecutive or frames 202, 204, 206, and 208 of panchromatic video 110, or from a plurality of frames of panchromatic video 110, not all of which are consecutive. In some examples, dictionary component 124 determines patch dictionary 224 by K-singular value decomposition (K-SVD) or other dictionary learning algorithms, as discussed below.

In some examples, display device 104 has a selected frame order, e.g., an interleaved or progressive frame order. In some of these examples, dictionary component 124 is configured to select dictionary patches for patch dictionary 224 based at least in part on the selected frame order of display device 104. For example, for an interleaved display device 104, dictionary component 124 can select pixels from every other frame in forming the sample patches. This matches the reconstruction (discussed below) to the requirements of display device 104 and can improve reconstruction quality and the image quality of reconstructed hyperspectral frames.

Reconstruction component 126 generates one or more generated hyperspectral video frame(s) 218 based at least in part on patch dictionary 224, panchromatic video 110, and hyperspectral snapshot 118. The generated frame(s) 218 are referred to herein as frames of a high-speed hyperspectral (HSHS) video. In some examples, HSHS frame(s) 218 include time-interpolated data from hyperspectral snapshot 118 and panchromatic video 110. In some examples, reconstruction component 126 can generate four HSHS frames 218 corresponding to frame times 210, 212, 214, and 216 of panchromatic frames 202, 204, 206, and 208, respectively. The generated HSHS frames 218 are illustrated as HSHS frames 230, 232, 234, and 236.

The HSHS frame(s) 218 can be generated by solving a compressive sensing equation, e.g., using orthogonal matching pursuit (OMP) or other solver algorithms. Other solvers that can be used include, for example, basis pursuit (BP), a focal underdetermined system solver (FOCUSS), and matching pursuit (MP). In some examples, reconstruction component 126 generates at least one of the HSHS frame(s) 218 based further on selected imaging characteristics of the panchromatic imager or the hyperspectral imager, as discussed below with reference to Eq. (6).

In some examples, reconstruction component 126 generates multiple HSHS frames 218 based at least in part on patch dictionary 224 and multiple frames 202-208 of panchromatic video 110. In some examples, reconstruction component 126 generates HSHS frame(s) 218 based solely on patch dictionary 224, the multiple frames 202-208 of panchromatic video 110, and hyperspectral snapshot 118, i.e., without using a dictionary based on hyperspectral snapshot 118, or derived from hyperspectral snapshot 118, e.g., using training techniques described herein.

In the illustrated example, video rendering component 128 renders at least a part of the HSHS video, e.g., at least one of the HSHS frame(s) 218, for display via display device 104. In some examples, video rendering component 128 assembles generated HSHS frames 218 (e.g., frames 230, 232, 234, and 236) to form a full HSHS video 238.

Reconstruction of HSHS video 238 can be performed using compressive sensing (CS) techniques. CS is sometimes used to compress or recover sparse data, such as sparse sensor data. Compressive sensing involves transforming P samples of sparse data into M coefficients, M<<P, using a projection matrix $\Phi$. The samples of sparse data and the coefficients can be represented as vectors. The M coefficients can then be stored or transmitted to a receiver. To recover the P samples, an inverse computation is carried out using the projection matrix $\Phi$ and the M coefficients. Since M<<P, there are a potentially-infinite number of possible solutions to the inverse computation. However, for sparse data, the sparsest of the possible solutions has a high probability of being the P-sample sparse data vector. The usable number of coefficients M is limited by how sparse the data are. Sparsity is often measured using a sparsity value $K_S$, which is the number of nonzero coefficients in a P-sample data vector. In an example, $M \geq K_S \log(P/K_S)$.

In some examples, frames 202-208 of panchromatic video 110 and hyperspectral snapshot 118 form the M coefficients from which the P-sample HSHS video 238 can be recovered using CS techniques. Patch dictionary 224 is used to represent the HSHS video 238 in a sparse way amenable to CS reconstruction. Without loss of generality, consider one hyperspectral snapshot 118 and K panchromatic frames (e.g., frames 202-208) captured concurrently with hyperspectral snapshot 118. In the illustrated example, K=4.

Define $G^C$ as hyperspectral snapshot 118 and $G_i^p$, $i \in [1, K]$, as frame i of panchromatic video 110 (e.g., $G_1^P$ can correspond to frame 202 and $G_K^P$ to frame 208). Without loss of generality, each G includes pixel data values arranged in a column vector, e.g., in raster-scan order. Define $F_i$, $i \in [1, K]$, as frame i of HSHS video 238. Define $\Phi$ as a matrix representing the imaging characteristics of panchromatic imager 106 and hyperspectral imager 114. Then the measured data can be represented as matrix G:

$$G = \begin{pmatrix} G^C \\ G_1^p \\ \vdots \\ G_K^p \end{pmatrix} \quad (1)$$

and the unknown HSHS video can be represented as matrix F:

$$F = \begin{pmatrix} F_1 \\ \vdots \\ F_k \end{pmatrix} \quad (2)$$

The measured data and unknown video are related by the imaging-characteristics matrix $\Phi$ as:

$$G = \Phi F \quad (3)$$

The formulation in Eq. (3) can be inverted to solve for F using CS techniques as shown in Eq. (4):

$$\hat{\alpha} = \underset{\alpha}{\arg\min} \|G - \Phi D \circ \alpha\|_2^2 + \tau\|\alpha\|_0 \quad (4)$$

where $$F = D \circ \alpha \quad (5)$$

for an appropriate choice of the "$\circ$" operator (e.g., matrix-vector multiplication), and where D is a patch dictionary 224 having a size and number of dimensions compatible with the "$\circ$" operator and a (e.g., having the same number of columns as rows in a column vector $\alpha$). That is, $D \circ \alpha$ is the M-coefficient sparse representation of F, so $D \circ \alpha$ can be found from the P-sample vector G by solving Eq. (4).

In some examples, $\alpha$ is a column vector and D is a matrix having dictionary patches arranged down the columns. In these examples, D has n columns, one for each dictionary patch, and m rows, where m is the number of pixel values in a dictionary patch. In some examples, n=4 m or n=$k_1$m for some integer $k_1$. In some examples, m=6×6×K, or m=$\lfloor pw \rfloor \times \lfloor ph \rfloor \times K$, where the input image is w pixels wide and h pixels high, and a percentage p, $0<p\leq1$, of the pixels are used. In an example, w=h=600 and p=0.01. The dictionary patches can form an orthogonal or orthonormal basis, but this is not required.

In some examples, a matrix $\Phi$ of imaging characteristics of an HSHS imaging system, as described herein, is defined as in Eq. (6):

$$\Phi = \begin{pmatrix} \Phi^c & & & \\ \Phi^p & 0 & \cdots & 0 \\ 0 & \Phi^p & \cdots & 0 \\ \vdots & \vdots & \ddots & \vdots \\ 0 & 0 & \cdots & \Phi^p \end{pmatrix} \quad (6)$$

where $\Phi^c$ is the observation matrix (response to a given stimulus) of hyperspectal imager 114 and $\Phi^p$ is the observation matrix of panchromatic imager 106. In some examples, $\Phi$ and its component observation matrices are determined based at least in part on physical properties of the optical systems of panchromatic imager 106 or hyperspectral imager 114, or spectral response functions of panchromatic sensor 108 or hyperspectral sensor 116.

In some examples, in order to increase the sparsity of $D \circ \alpha$, D is determined to be an over-complete dictionary, e.g., a dictionary representable as a non-square matrix and having more dictionary patches than necessary to provide reconstructed HSHS video 238 (F) that corresponds to the frames of the panchromatic video 110 and hyperspectral snapshot 118 within a selected level of tolerance.

There is often a strong correlation between image data in hyperspectral snapshot 118 and image data in corresponding frames of panchromatic video 110. For example, since hyperspectral snapshot 118 and frame 202 of panchromatic video 110 can be captured concurrently, hyperspectral snapshot 118 and frame 202 represent generally the same scene 112, so have edges and spatial detail in generally similar locations. Accordingly, in some examples, using data from panchromatic video 110 to train the dictionary D provides dictionary patches that are strongly correlated with the HSHS video 238 to be reconstructed. As a result, dictionary D provides high sparsity of coefficient vector $\alpha$ when representing the hyperspectral snapshot 118. This improves the accuracy of CS-based reconstruction of HSHS video 238.

In some examples, dictionary component 124 randomly samples dictionary patches or training patches from panchromatic video 110, as discussed above. In some examples, dictionary component 124 selects samples from frames 202-208 of panchromatic video 110, individual ones of the samples including data from at least two of the plurality of frames 202-208 of panchromatic video 110. For example, 60,000 random patches can be sampled from a 256 W×256

H×24 frame panchromatic video 110. The number n (n>m) of patches can be selected to provide a predetermined level of reconstruction accuracy. As noted above, m denotes the number of pixel values or other image data values in a training patch.

In some examples, dictionary component 124 clusters the samples (the training patches) to provide a selected number of the dictionary patches in patch dictionary 224. For example, dictionary component 124 can cluster the samples by k-means, k-medoids, mean-shift clustering, K-SVD, or another clustering or dictionary learning technique. Other example techniques that can be used include maximum a-posteriori probability, maximum likelihood methods, the method of optimal directions (MOD), and principal component analysis (PCA).

For k-means and K-SVD, the number n of clusters (i.e., the number n of dictionary patches) can be determined empirically as $k_1 m$, as noted above. A value for $k_1$ (and thus for n) can be selected to provide a predetermined level of reconstruction accuracy. In some examples, dictionary component 124 selects the cluster centers as the dictionary patches (columns of D). The cluster centers do not necessarily coincide with any of the training patches.

In some examples, reconstruction component 126 generates one or more high-speed hyperspectral video frame(s) 218, e.g., one or more additional hyperspectral video frame(s), based at least in part on the hyperspectral snapshot 118, the panchromatic video 110, e.g., one or more frames thereof, and the plurality of dictionary patches in patch dictionary 224, e.g., the cluster centers arranged to form matrix D. Reconstruction component 126 can determine α values as noted in Eq. (4), above, e.g., using the orthogonal matching pursuit algorithm. Reconstruction component 126 can then compute $F = D \circ \alpha$ to determine F, the reconstructed HSHS video 238.

Figure 3:
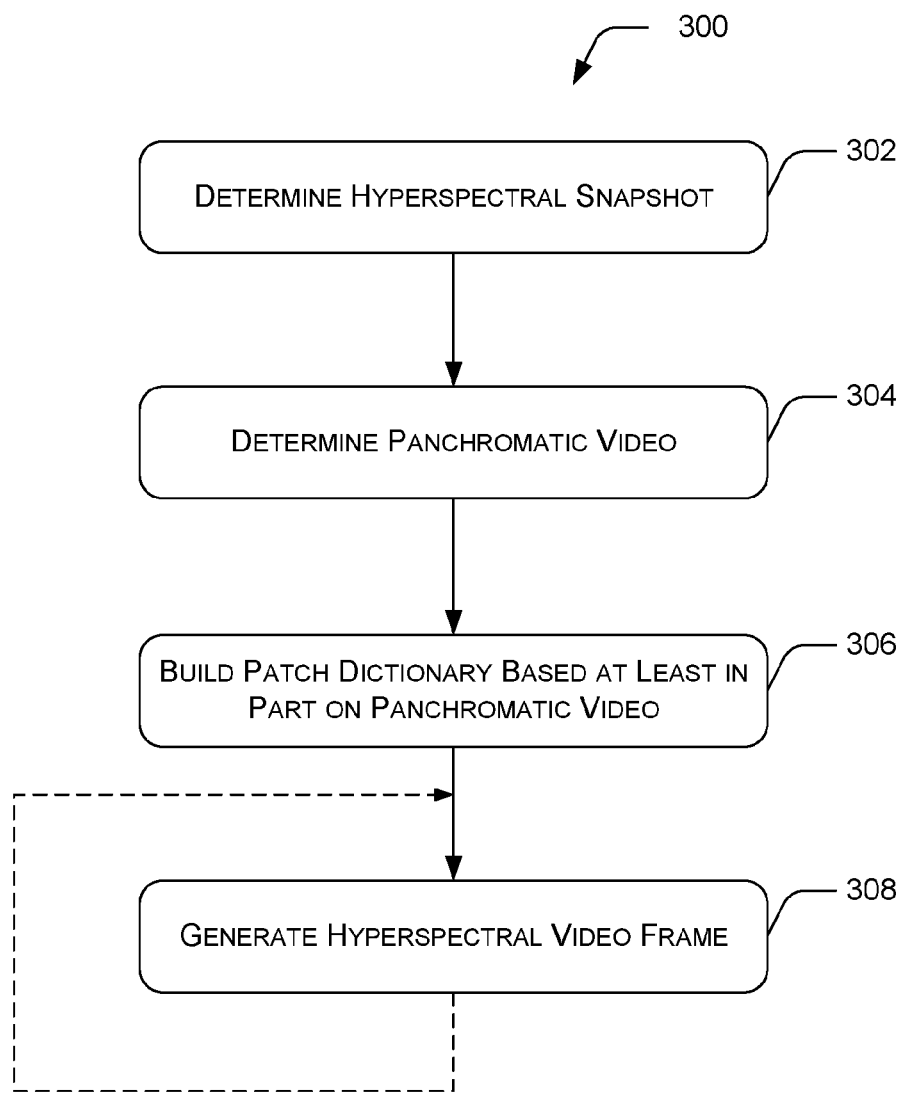
FIG. 3 is a flow diagram of an example method for generating a high-speed hyperspectral (HSHS) video.

FIG. 3 illustrates an example method 300 for generating a high-speed hyperspectral (HSHS) video. The method is illustrated as a set of operations shown as discrete blocks. The method can be implemented in any suitable hardware, software, firmware, or combination thereof. The order in which the operations are described is not to be construed as a limitation. For clarity of explanation, reference is herein made to various components and data items shown in FIGS. 1 and 2 that can carry out or participate in the steps of the exemplary method. It should be noted, however, that other components can be used; that is, exemplary method(s) shown in FIG. 3 are not limited to being carried out by the identified components.

At block 302, a hyperspectral snapshot 118 is determined. For example, hyperspectral imager 114 can capture hyperspectral snapshot 118 of scene 112, or processor 120 can receive hyperspectral snapshot 118 via network 132 or from a local media source as described above. In some examples, hyperspectral imager 114 captures data corresponding to one or more spectral passbands of the hyperspectral imager 114.

At block 304, a panchromatic video 110 is determined. For example, panchromatic imager 106 can capture panchromatic video 110 of scene 112, or processor 120 can receive panchromatic video 110 via network 132. In some examples, block 304 can include receiving panchromatic video 110 from a media source local to computing device 102, such as a file stored in a memory of computing device 102 or a digital video disc (DVD) in a DVD drive of the computing device 102. In some examples, panchromatic imager 106 captures data corresponding to a spectral passband at least encompassing one or more spectral passbands of hyperspectral imager 114. In some examples, the determined panchromatic video 110 has a first frame rate, hyperspectral snapshot 118 has a second frame rate, and the first frame rate is greater than the second frame rate.

In some examples, panchromatic video corresponds to a frame time of the hyperspectral snapshot. For example, the panchromatic video can be captured during the frame time of hyperspectral snapshot 118, or in a fixed time or phase relationship with the frame time of hyperspectral snapshot 118. In some examples, the panchromatic video includes a plurality of panchromatic frames. In the example shown in FIG. 2, panchromatic video 110 includes a plurality of panchromatic frames 202, 204, 206, and 208 captured during a frame time of hyperspectral snapshot 118.

At block 306, a patch dictionary 224 is built based at least in part on the panchromatic video 110. For example, clustering can be performed as described above with reference to matrix D in Eq. (5). In some examples, one or more dictionary patches in patch dictionary 224 are determined based solely on panchromatic video 110.

At block 308, at least one frame of the HSHS video 238 is generated based at least in part on patch dictionary 224, panchromatic video 110, and hyperspectral snapshot 118. In some examples, data of panchromatic video 110, and hyperspectral snapshot 118 can be arranged in a G matrix as described above with reference to Eq. (1). In some examples, a solver can be used to determine a values in Eq. (4), above. In some examples, as represented by the dashed arrow, multiple frames of HSHS video 238 can be generated based at least in part on patch dictionary 224 and multiple frames of panchromatic video 110. In some examples, as noted above, at least one frame of HSHS video 238 can be generated based solely on patch dictionary 224, multiple frames of panchromatic video 110, and hyperspectral snapshot 118. In this way, at blocks 306 and 308, a high-speed hyperspectral (HSHS) video is generated.

Figure 4:
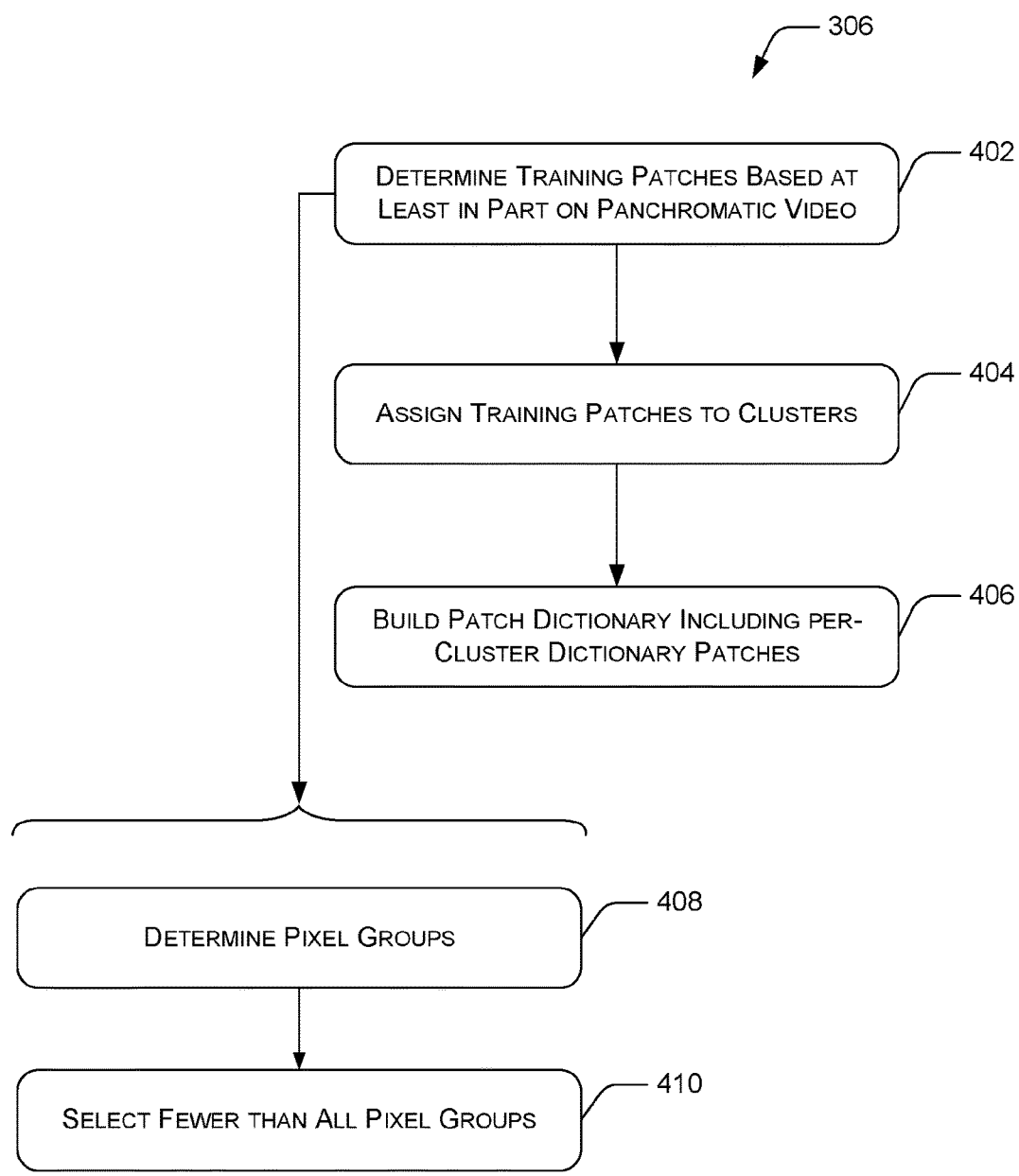
FIG. 4 is a flow diagram of example methods for building a patch dictionary.

FIG. 4 illustrates an example method 306 for building patch dictionary 224.

At block 402, one or more training patches are determined based at least in part on pixel values of one or more pixels of one or more frames of panchromatic video 110. This can be done, e.g., by random sampling as described above. In some examples, a particular training patch of the training patches includes samples multiple pixels high and multiple pixels wide taken from a plurality of the frames of the panchromatic video. In some examples, the particular training patch includes samples taken from a plurality of consecutive frames of the panchromatic video. In some examples, block 402 can include selecting, normalizing, scaling, or otherwise processing pixel values or other image data to determine the training patches.

At block 404, the determined one or more training patches are assigned to individual ones of a plurality of clusters. For example, dictionary component 124, e.g., executing on processor 120, can use K-SVD or another clustering algorithm to assign the training patches to clusters.

At block 406, the patch dictionary is built to include respective dictionary patches for individual ones of the plurality of clusters. For example, dictionary component 124, e.g., executing on processor 120, can select a representative dictionary patch for each of the clusters. The representative dictionary patch of a cluster can be, e.g., a mean or medoid of data in that cluster.

In some examples, block 402 includes blocks 408 and 410.

At block 408, a plurality of pixel groups is determined, e.g., by dictionary component 124, e.g., executing on processor 120. Individual ones of the pixel groups can include data of multiple pixels selected from the one or more frames of panchromatic video 110. For example, panchromatic video 110 can be spatially divided along boundaries 226, and a pixel group can be selected to include the pixels of individual ones, or one or more, of the 12 cells (in the example of FIG. 2). The pixel groups can be arranged, e.g., according to a 3-D (height, width, time) grid having uniform spacing along multiple dimensions (e.g., equal height and width), a 3-D grid having different spacings in each dimension, or a random, pseudorandom, stochastic, or irregular pattern or arrangement.

At block 410, fewer than all of the pixel groups are selected, e.g., by dictionary component 124, e.g., executing on processor 120. Individual ones of the one or more training patches are determined to include respective ones of the selected pixel groups. For example, six of the 12 cells shown in the example of FIG. 2 can be selected for use as training patches. This selection can be made at random.

Figure 5:
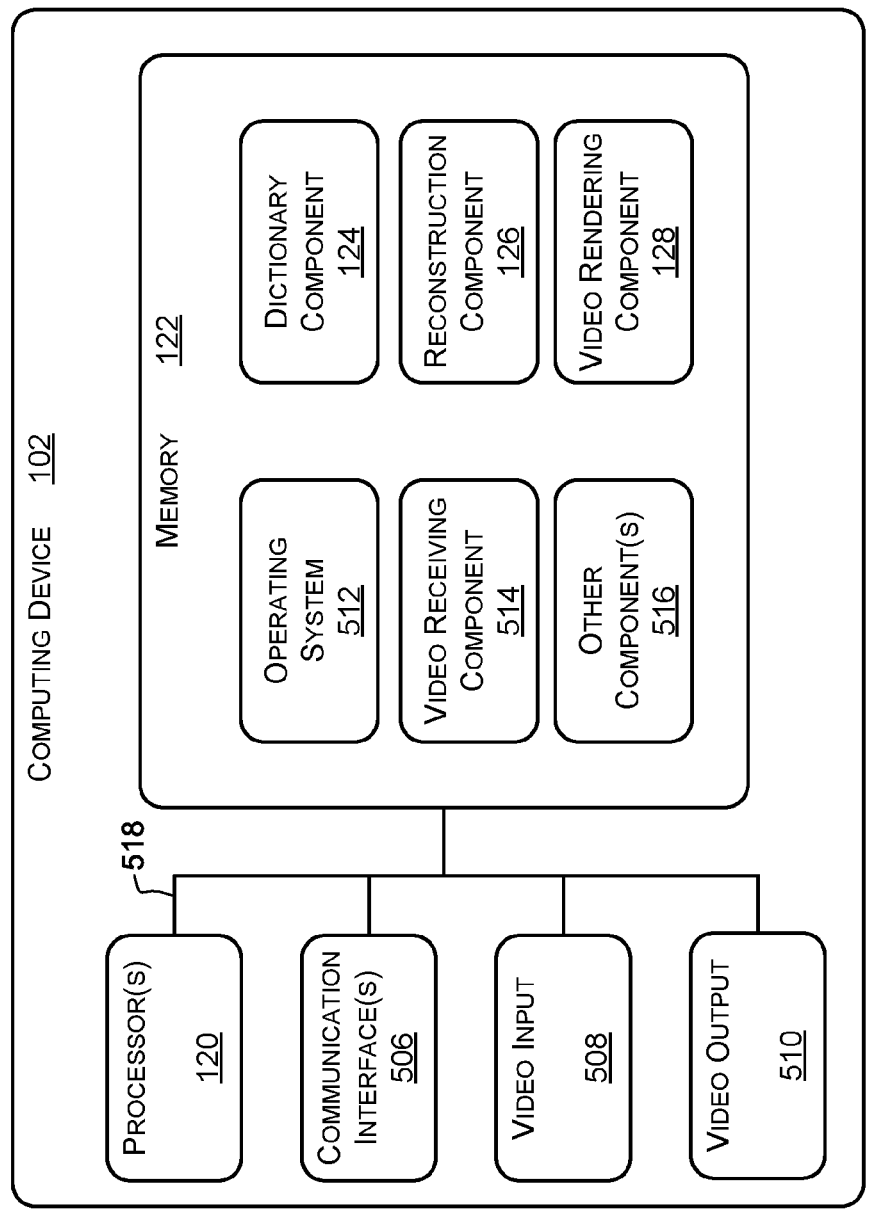
FIG. 5 is a block diagram of selected components of an example computing device implementing high-speed hyperspectral video imaging.

FIG. 5 illustrates select components of an example computing device 102. In the illustrated example, computing device 102 includes one or more processor(s) 120, a memory 122, communication interface(s) 502, video input 504, and video output 506. Memory 122 can be implemented as any combination of various types of memory components. Examples of possible memory components include a random access memory (RAM), a disk drive, a mass storage component, and a non-volatile memory (e.g., ROM, Flash, EPROM, EEPROM, etc.). Alternative implementations of computing device 102 can include a range of processing and memory capabilities. For example, full-resource computing devices can be implemented with substantial memory and processing resources, including a disk drive to store content for replay by the viewer. Low-resource computing devices, however, can have limited processing and memory capabilities, such as a limited amount of RAM, no disk drive, and limited processing capabilities.

Processor(s) 120 process various instructions to control the operation of computing device 102 and to communicate with other electronic and computing devices. The memory 122 stores various information and/or data, including, for example, an operating system 508, a video receiving component 510, a dictionary component 124, a reconstruction component 126, a video rendering component 128, and optionally one or more other applications 512. These blocks stored in memory 122 can be executed on processor(s) 120. The other components 512 can include, for example, an Internet browser that includes video capabilities, a media player application, a video editing application, a video streaming application, a television viewing application, and so on. In some examples, computer-executable instructions of dictionary component 124, reconstruction component 126, video rendering component 128, and applications 512 stored in one or more computer-readable media (e.g., memory 122), when executed on processor 120 of computing device 102, direct computing device 102 to perform functions listed below with respect to the relevant components in memory 122.

Communication interface(s) 502 enable computing device 102 to communicate with other computing devices, and can represent other means by which computing device 102 can receive video content. For example, in an environment that supports transmission of video content over an IP network, communication interface(s) 502 can represent connection(s) via which computing device 102 can receive video content, e.g., via a particular universal resource locator (URL).

Video input 504 includes, or is communicatively connected with, for example, one or more tuners, video-capture devices, video encoders, or format converters, enabling computing device 102 to receive and store video. In some examples, video input 504 can include multiple channels to receive data from panchromatic imager 106 and hyperspectral imager 114 concurrently. In some examples, computing device 102 can include multiple video inputs 504, one or more to receive data from panchromatic imager 106 and one or more to receive data from hyperspectral imager 114.

Video output 506 includes, or is communicatively connected with, for example, a display screen, enabling computing device 102 to present video content. In example implementations, video output 506 provides signals to a television or other display device that displays the video data.

In some examples, video-receiving component 510, when executed by processor(s) 120 (and likewise throughout), receives a hyperspectral snapshot and a plurality of panchromatic video frames. This can be as described above with reference to blocks 302 and 304 of FIG. 3.

In some examples, dictionary component 124 determines a plurality of dictionary patches using image data of the plurality of panchromatic video frames. This can be as described above with reference to block 306 of FIG. 3, and with reference to FIG. 4. In some examples, the computer-executable instructions cause dictionary component 124 to select samples from the panchromatic video frames, individual ones of the samples including data from at least two of the plurality of panchromatic video frames. This can be done, e.g., as discussed above with reference to blocks 402, 408, or 410 of FIG. 4 or as described above with reference to spatial region 228 of FIG. 2. Dictionary component 124 then clusters the samples to provide a selected number of the dictionary patches, e.g., as discussed above with reference to blocks 404 and 406 of FIG. 4.

In some examples, reconstruction component 126 generates one or more hyperspectral video frames (e.g., HSHS frame(s) 218) based at least in part on the received hyperspectral snapshot, one or more panchromatic frames, and the plurality of dictionary patches. This can be done as described above with reference to block 308 of FIG. 3. In some examples, computer-executable instructions cause reconstruction component 126 to determine a representation of at least part of the received hyperspectral snapshot and more than one of the plurality of the panchromatic video frames based at least in part on more than one of the plurality of dictionary patches. This can be done, e.g., as discussed above with reference to Eqs. (1) and (4).

Although shown separately, some of the components of computing device 102 can be implemented together in a single hardware device, such as in an application specific integrated circuit (ASIC). Additionally, a system bus 514 typically connects the various components within computing device 102. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Any of the components illustrated in FIG. 5 can be in hardware, software, or a combination of hardware and software. Further, any of the components illustrated in FIG. 5, e.g., memory 122, can be implemented using any form of computer-readable media that is accessible by computing device 102, either locally or remotely, including over a network 132. Computer-readable media includes two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media can embody computer readable instructions, data structures, program modules, or other data in a modulated data signal, such as a carrier wave, or other transmission mechanism. As defined herein, computer storage media does not include communication media.

Figure 6:
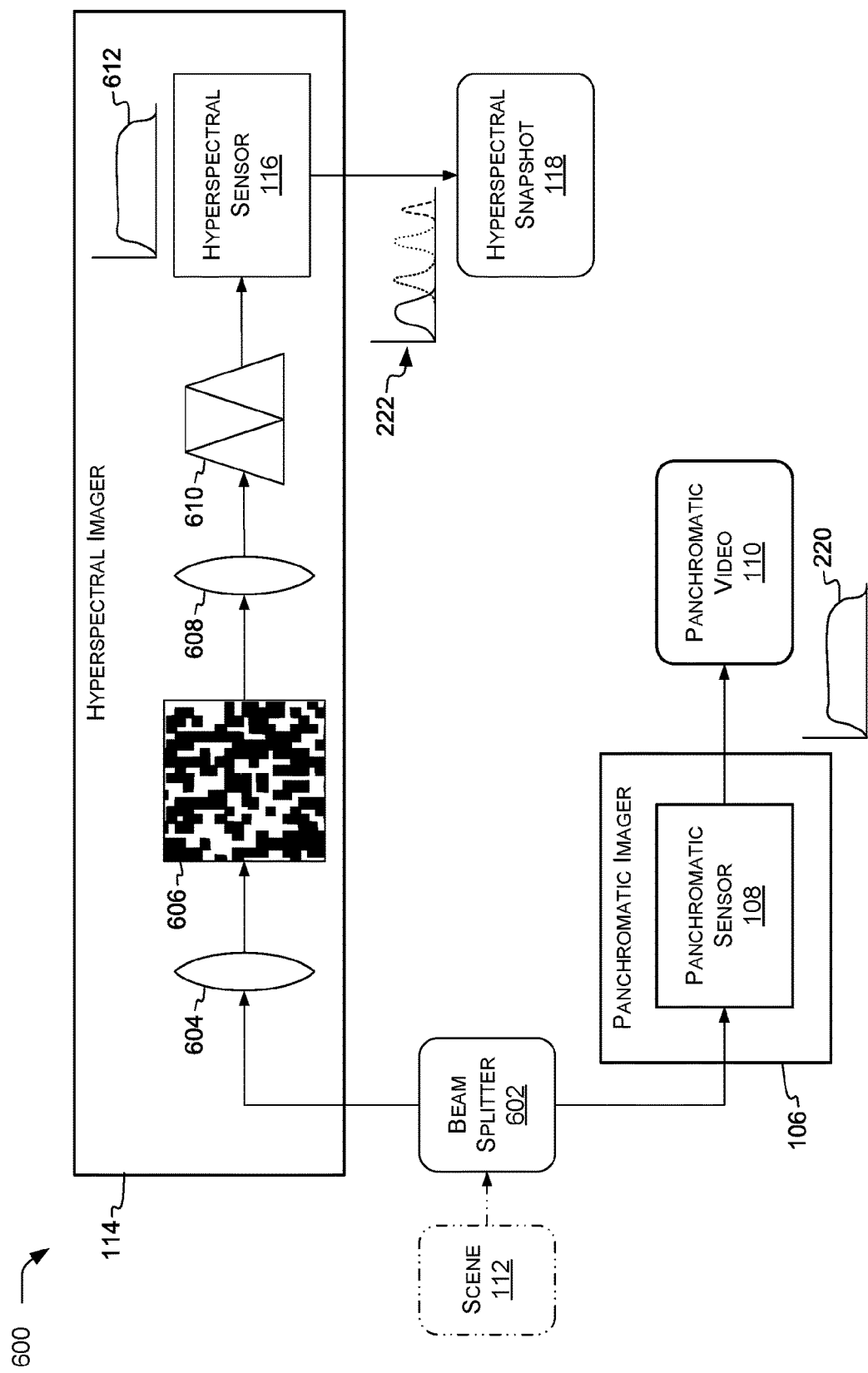
FIG. 6 is a block diagram of an example imaging system.

FIG. 6 shows an example imaging system 600 for imaging scene 112 (shown in phantom). Imaging system 600 includes panchromatic imager 106 and hyperspectral imager 114. Beam splitter 602 divides light from scene 112, e.g., into two substantially equal parts. Beam splitter 602 can include, e.g., a pellicle beam splitter, a half-silvered mirror, a lenticular array, or other components configured to divide light from the scene. Beam splitter 602 provides part (e.g., one of the two parts) to panchromatic sensor 108 of panchromatic imager 106 having a spectral response shown in curve 220. Panchromatic sensor 108 provides panchromatic video 110.

Another part (e.g., the other of the two parts) of the light from beam splitter 602 is provided to objective lens 604 in hyperspectral imager 114, e.g., an SD-CASSI. Light from the objective lens passes through mask 606, e.g., a coded aperture. Mask 606 can include substantially opaque elements interspersed with substantially transmissive elements, e.g., as squares on a grid. The pattern of opaque and transmissive elements can be determined randomly, e.g., with a 50% probability of each individual square being opaque as opposed to transparent (e.g., a Bernoulli distribution with a probability p=0.5). The pattern can also, or alternatively, correspond to a bit pattern, e.g., of a cyclic S-matrix code cyclically permuted over mask 606. Relay lens 608 images the plane of mask 606 through disperser 610 onto hyperspectral sensor 116. Disperser 610 can include, e.g., an equilateral prism, a grating, or another disperser.

As represented by curve 612, the hyperspectral sensor 116 in hyperspectral imager 114 is sensitive to a range of wavelengths at least broad enough to encompass the individual spectral passbands to be measured and output by hyperspectral imager 114 (curves 222). The disperser 610 causes images of mask 606 to appear in the image captured by hyperspectral sensor 116 at different locations and brightnesses depending on the relative contribution of each spectral passband. As a result, hyperspectral imager 114 can produce hyperspectral snapshot 118 including data from multiple spectral passbands (curves 222) using hyperspectral sensor 116 having a broad spectral passband represented by curve 612. In hyperspectral snapshot 118, the data for one spectral passband can be interleaved among, superimposed on, or otherwise coded in combination with data for other spectral passband(s). In this example, the different spectral passbands are coded as superimposed, spatially-dispersed images of the mask 606.

In some examples, the additional optical components between beam splitter 602 and hyperspectral sensor 116 attenuate light reaching hyperspectral sensor 116 compared to light reaching panchromatic sensor 108. In some examples, hyperspectral sensor 116 operates at a lower frame rate (longer frame time) than panchromatic sensor 108 in order to collect more light and partly or wholly overcome this attenuation. Various aspects described herein permit reconstructing high-frame-rate hyperspectral imagery, e.g., HSHS video 238, using the high-frame-rate panchromatic video 110 and the low-frame-rate hyperspectral snapshot 118.

EXAMPLE RESULTS

The light efficiency of various aspects can reach 75% of the incident light being captured. This is superior to CASSI, with a theoretical efficiency of 50%, and DCSI, with a theoretical efficiency of 25%.

Table 1 shows simulation results of a comparison of temporal interpolation results of CASSI reconstruction (CASSI-TI), two-step iterative shrinkage/thresholding reconstruction with the total variation (TV) regularizer (TwIST), and dictionary-based reconstruction (DBR) (e.g., as described herein). Results are shown for various values of acceleration K. Peak signal-to-noise ratio (PSNR), structural similarity (SSIM), root mean squared error (RMSE), and spectral angle mapping (SAM) are shown. PSNR and SSIM are calculated based on each 2-D spatial image, which measure the spatial fidelity between the reconstruction results and the original hyperspectral snapshot. A larger value of these two metrics indicates a higher fidelity reconstruction. RMSE and SAM are calculated based on each one-dimensional (1-D) spectrum vector, and measure the spectral fidelity of the reconstruction. A smaller value of these two metrics suggests a better reconstruction. All metrics are averaged across the remaining dimensions.

As shown in Table 1, the CASSI-TI results suffer from large deviation from the original test data. In contrast, both TwIST and DBR recover the four-dimensional (4-D) high-speed hyperspectral video (having width, height, frame, and spectral passband dimensions) even under K=8. Moreover, DBR outperforms TwIST under all acceleration rates, which demonstrates the effectiveness of example dictionary learning techniques described herein, e.g., as discussed above with reference to FIG. 4.

TABLE 1

| K | Method | Spatial Metric | | Spectral Metric | |
|---|---|---|---|---|---|
| | | PSNR | SSIM | RMSE | SAM |
| 2 | CASSI-TI | 26.99 | 0.611 | 0.196 | 0.071 |
| | TwIST | 32.94 | 0.951 | 0.089 | 0.059 |
| | DBR | 34.25 | 0.961 | 0.075 | 0.050 |
| 4 | CASSI-TI | 26.45 | 0.573 | 0.214 | 0.081 |
| | TwIST | 32.15 | 0.932 | 0.093 | 0.061 |
| | DBR | 33.06 | 0.940 | 0.084 | 0.057 |
| 8 | CASSI-TI | 23.08 | 0.447 | 0.317 | 0.124 |
| | TwIST | 28.56 | 0.912 | 0.136 | 0.089 |
| | DBR | 29.17 | 0.922 | 0.126 | 0.085 |

A scene was measured using an imaging system similar to imaging system 600, FIG. 6. The tested panchromatic imager 106 included a PointGrey™ FL3-U3-13Y3M-C panchromatic sensor 108 equipped with an 8 mm objective lens. The tested panchromatic imager 106 captured up to 150 fps video at a resolution of up to 1280×1024 pixels. The tested panchromatic sensor 108 was a monochromatic, 1.3 megapixel CMOS imager in a ½" format with a 4.8 µm pixel pitch and a global (not rolling) shutter.

Hyperspectral imager 114 included an 8 mm objective lens 604 used to project the scene onto a coded aperture (mask 606). The tested mask 606 included a random binary pattern of substantially opaque elements and substantially transparent elements. The tested mask 606 had 300×300 elements, each 10 µm×10 µm. The tested disperser 610 included a doublet-Amici prism arranged to vertically disperse the spectral information with the center wavelength at 550 nm. The tested hyperspectral sensor 116 was of the same type as the tested panchromatic sensor 108. In the tested configuration, each element on mask 606 was mapped to 2×2 pixels on hyperspectral sensor 116 by relay lens 608. The tested relay lens 608 was an Edmund 45-762. The effective spatial resolution of the tested hyperspectral imager 114 was thus 600×600 pixels. In addition, optical filters (not shown) with a spectral passband from 450 nm to 650 nm were placed between scene 112 and each of panchromatic sensor 108 and hyperspectral sensor 116 to restrict the spectrum to at most the range of 450 nm-650 nm. Other ranges or spectral passbands can be used in various examples.

Table 2 shows experimental results of a measured scene including three shapes of different colors. For each shape, root-mean-square error (RMSE) values are shown for CASSI reproduction and for DBR with three different acceleration values (K=5, K=10, and K=20) (e.g., as described herein). Smaller RMSE values are better.

TABLE 2

| Shape | K = 5 | K = 10 | K = 20 | CASSI |
|---|---|---|---|---|
| Circle | 0.037 | 0.042 | 0.043 | 0.060 |
| Rectangle | 0.031 | 0.034 | 0.044 | 0.070 |
| Diamond | 0.043 | 0.044 | 0.045 | 0.085 |

EXAMPLE CLAUSES

A: A method comprising: determining a hyperspectral snapshot; determining a panchromatic video corresponding to a frame time of the hyperspectral snapshot, the panchromatic video including a plurality of panchromatic frames; and generating a high-speed hyperspectral (HSHS) video by: building a patch dictionary based at least in part on the panchromatic video; and generating at least one frame of the HSHS video based at least in part on the patch dictionary, the panchromatic video, and the hyperspectral snapshot.

B: A method as recited in paragraph A, wherein determining the panchromatic video includes capturing the panchromatic video of a scene using a panchromatic imager.

C: A method as recited in paragraph B, wherein: determining the hyperspectral snapshot includes capturing the hyperspectral snapshot of the scene using a hyperspectral imager; the hyperspectral imager captures data corresponding to one or more spectral passbands of the hyperspectral imager; and the panchromatic imager captures data corresponding to a spectral passband at least encompassing the one or more spectral passbands of the hyperspectral imager.

D: A method as recited in any of paragraphs A-C, wherein building the patch dictionary includes: determining one or more training patches based at least in part on pixel values of one or more pixels of one or more of the plurality of panchromatic frames; assigning the determined one or more training patches to individual ones of a plurality of clusters; and building the patch dictionary to include respective dictionary patches for individual ones of the plurality of clusters.

E: A method as recited in paragraph D, wherein a particular training patch of the training patches includes samples multiple pixels high and multiple pixels wide taken from at least some of the plurality of panchromatic frames.

F: A method as recited in paragraph E, wherein the particular training patch includes samples taken from a plurality of consecutive ones of the plurality of panchromatic frames.

G: A method as recited in any of paragraphs D-F, wherein determining the one or more training patches includes: determining a plurality of pixel groups, wherein individual ones of the pixel groups include data of multiple pixels selected from the plurality of panchromatic frames; and selecting fewer than all of the pixel groups, wherein individual ones of the one or more training patches include respective ones of the selected pixel groups.

H: A method as recited in any of paragraphs A-G, wherein generating the at least one frame of the HSHS video includes generating multiple frames of the HSHS video based at least in part on the patch dictionary and multiple ones of the plurality of panchromatic frames.

I: A method as recited in paragraph H, wherein generating the at least one frame of the HSHS video includes generating the at least one frame of the HSHS video based solely on the patch dictionary, the plurality of panchromatic frames, and the hyperspectral snapshot.

J: A method as recited in any of paragraphs A-I, wherein building the patch dictionary includes determining one or more dictionary patches in the patch dictionary based solely on the panchromatic video.

K: A computing device comprising: at least one processor; a memory configured to store a panchromatic video and a hyperspectral snapshot; and a dictionary component stored in the memory and executable on the at least one processor, the dictionary component configured to generate a patch dictionary based at least in part on the panchromatic video; and a reconstruction component stored in the memory and executable on the at least one processor, the reconstruction component configured to generate at least one frame of a high-speed hyperspectral (HSHS) video based at least in part on the patch dictionary, the panchromatic video, and the hyperspectral snapshot.

L: A computing device as recited in paragraph K, further comprising a display device and a video rendering component stored in the memory and executable on the at least one processor, the video rendering component configured to render at least a part of the HSHS video for display via the display device.

M: A computing device as recited in paragraph L, wherein the display device has a selected frame order and the dictionary component is configured to select dictionary patches for the patch dictionary based at least in part on the selected frame order.

N: A computing device as recited in any of paragraphs K-M, further comprising a panchromatic imager configured to capture the panchromatic video of a scene and a hyperspectral imager operated synchronously with respect to the panchromatic imager and configured to capture the hyperspectral snapshot of the scene.

O: A computing device as recited in paragraph N, wherein the panchromatic imager is configured to capture a plurality of frames of the panchromatic video during a frame time of the hyperspectral imager.

P: A computing device as recited in paragraph N or O, wherein the panchromatic imager has a spectral passband at least encompassing one or more spectral passbands of the hyperspectral imager.

Q: A computing device as recited in any of paragraphs N-P, wherein the reconstruction component is configured to generate the at least one frame of the HSHS video based further on selected imaging characteristics of the panchromatic imager or the hyperspectral imager.

R: One or more computer-readable media comprising computer-executable instructions that, when executed on a processor of a computing device, direct the computing device to: receive a hyperspectral snapshot and a plurality of panchromatic video frames; determine a plurality of dictionary patches using image data of the plurality of panchromatic video frames; and generate a high-speed hyperspectral (HSHS) video frame based at least in part on the panchromatic video frames, the hyperspectral snapshot, and the plurality of dictionary patches.

S: One or more computer-readable media as recited in paragraph R, wherein the instructions for determining the plurality of dictionary patches comprise instructions that, when executed on a processor of a computing device, direct the computing device to: select samples from the panchromatic video frames, individual ones of the samples including data from at least two of the plurality of panchromatic video frames; and cluster the samples to provide a selected number of the dictionary patches.

T: One or more computer-readable media as recited in paragraph R or S, wherein the instructions for generating the HSHS video frame comprise instructions that, when executed on a processor of a computing device, direct the computing device to determine a representation of at least part of the hyperspectral snapshot and more than one of the plurality of the panchromatic video frames based at least in part on more than one of the plurality of dictionary patches.

U: A system comprising: means for determining a hyperspectral snapshot; means for determining a panchromatic video corresponding to a frame time of the hyperspectral snapshot, the panchromatic video including a plurality of panchromatic frames; means for generating a high-speed hyperspectral (HSHS) video, including means for building a patch dictionary based at least in part on the panchromatic video; and means for generating at least one frame of the HSHS video based at least in part on the patch dictionary, the panchromatic video, and the hyperspectral snapshot.

V: A system as recited in paragraph U, wherein the means for determining the panchromatic video includes means for capturing the panchromatic video of a scene using a panchromatic imager.

W: A system as recited in paragraph V, wherein: the means for determining the hyperspectral snapshot includes means for capturing the hyperspectral snapshot of the scene using a hyperspectral imager; the hyperspectral imager captures data corresponding to one or more spectral passbands of the hyperspectral imager; and the panchromatic imager captures data corresponding to a spectral passband at least encompassing the one or more spectral passbands of the hyperspectral imager.

X: A system as recited in any of paragraphs U-W, wherein the means for building the patch dictionary includes: means for determining one or more training patches based at least in part on pixel values of one or more pixels of one or more of the plurality of panchromatic frames; means for assigning the determined one or more training patches to individual ones of a plurality of clusters; and means for building the patch dictionary to include respective dictionary patches for individual ones of the plurality of clusters.

Y: A system as recited in paragraph X, wherein a particular training patch of the training patches includes samples multiple pixels high and multiple pixels wide taken from at least some of the plurality of panchromatic frames.

Z: A system as recited in paragraph Y, wherein the particular training patch includes samples taken from a plurality of consecutive ones of the plurality of panchromatic frames.

AA: A system as recited in any of paragraphs X-Z, wherein the means for determining the one or more training patches includes: means for determining a plurality of pixel groups, wherein individual ones of the pixel groups include data of multiple pixels selected from the plurality of panchromatic frames; and means for selecting fewer than all of the pixel groups, wherein individual ones of the one or more training patches include respective ones of the selected pixel groups.

AB: A system as recited in any of paragraphs U-AA, wherein the means for generating the at least one frame of the HSHS video includes means for generating multiple frames of the HSHS video based at least in part on the patch dictionary and multiple ones of the plurality of panchromatic frames.

AC: A system as recited in paragraph AB, wherein the means for generating the at least one frame of the HSHS video includes means for generating the at least one frame of the HSHS video based solely on the patch dictionary, the plurality of panchromatic frames, and the hyperspectral snapshot.

AD: A system as recited in any of paragraphs U-AC, wherein the means for building the patch dictionary includes means for determining one or more dictionary patches in the patch dictionary based solely on the panchromatic video.

AE: A computer-readable medium, e.g., a computer storage medium, having thereon computer-executable instructions, the computer-executable instructions upon execution configuring a computer to perform operations as any of paragraphs A-J recites.

AF: A device comprising: a processor; and a computer-readable medium, e.g., a computer storage medium, having thereon computer-executable instructions, the computer-executable instructions upon execution by the processor configuring the device to perform operations as any of paragraphs A-J describe.

AG: A system comprising: means for processing; and means for storing having thereon computer-executable instructions, the computer-executable instructions including means to configure the device to carry out a method as any of paragraphs A-J describe.

CONCLUSION

Although generating high-speed hyperspectral (HSHS) video data has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, such as one or more internal or external CPUs or GPUs, and/or one or more pieces of hardware logic such as FPGAs, DSPs, or other types of accelerators.

The methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

The invention claimed is:

1. A method comprising:
   determining a hyperspectral snapshot at a frame time;
   determining a panchromatic video corresponding to the frame time of the hyperspectral snapshot, the panchromatic video including a plurality of panchromatic frames during the frame time; and
   generating a high-speed hyperspectral (HSHS) video by:
      building a patch dictionary based at least in part on the plurality of the panchromatic frames of the panchromatic video at the frame time of the hyperspectral snapshot; and
      generating at least one frame of the HSHS video based at least in part on the patch dictionary, the panchromatic video, and the hyperspectral snapshot.

2. The method of claim 1, wherein:
   determining the panchromatic video includes capturing the panchromatic video of a scene using a panchromatic imager;
   determining the hyperspectral snapshot includes capturing the hyperspectral snapshot of the scene using a hyperspectral imager;
   the hyperspectral imager captures data corresponding to one or more spectral passbands of the hyperspectral imager; and
   the panchromatic imager captures data corresponding to a spectral passband at least encompassing the one or more spectral passbands of the hyperspectral imager.

3. The method of claim 1, wherein building the patch dictionary includes:
   determining one or more training patches based at least in part on pixel values of one or more pixels of one or more of the plurality of panchromatic frames corresponding to the frame time of the hyperspectral snapshot;
   assigning the determined one or more training patches to individual ones of a plurality of clusters; and
   building the patch dictionary to include respective dictionary patches for individual ones of the plurality of clusters.

4. The method of claim 3, wherein a particular training patch of the training patches includes samples multiple pixels high and multiple pixels wide taken from at least some of the plurality of panchromatic frames.

5. The method of claim 4, wherein the particular training patch includes samples taken from a plurality of consecutive ones of the plurality of panchromatic frames.

6. The method of claim 3, wherein determining the one or more training patches includes:
   determining a plurality of pixel groups, wherein individual ones of the pixel groups include data of multiple pixels associated with one or more regions within boundaries inside the plurality of panchromatic frames; and
   selecting fewer than all of the pixel groups, wherein individual ones of the one or more training patches include respective ones of the selected pixel groups.

7. The method of claim 1, wherein generating the at least one frame of the HSHS video includes generating multiple frames of the HSHS video based at least in part on the patch dictionary and multiple ones of the plurality of panchromatic frames.

8. A computing device comprising:
   at least one processor;
   a memory configured to store a panchromatic video and a hyperspectral snapshot, wherein the panchromatic video and the hyperspectral snapshot correspond to a frame time and the panchromatic video including a plurality of panchromatic frames during the frame time;
   a dictionary component stored in the memory and executable on the at least one processor, the dictionary component configured to generate a patch dictionary based at least in part on the plurality of the panchromatic frames of the panchromatic video at the frame time corresponding to the hyperspectral snapshot; and a reconstruction component stored in the memory and executable on the at least one processor, the reconstruction component configured to generate at least one frame of a high-speed hyperspectral (HSHS) video based at least in part on the patch dictionary, the panchromatic video, and the hyperspectral snapshot.

9. The computing device of claim 8, further comprising a display device and a video rendering component stored in the memory and executable on the at least one processor, the video rendering component configured to render at least a part of the HSHS video for display via the display device.

10. The computing device of claim 9, wherein the display device has a selected frame order and the dictionary component is configured to select dictionary patches for the patch dictionary based at least in part on the selected frame order.

11. The computing device of claim 8, further comprising a panchromatic imager configured to capture the panchromatic video of a scene and a hyperspectral imager operated synchronously with respect to the panchromatic imager and configured to capture the hyperspectral snapshot of the scene.

12. The computing device of claim 11, wherein the reconstruction component is configured to generate the at least one frame of the HSHS video based further on selected imaging characteristics of the panchromatic imager or the hyperspectral imager.

13. One or more computer-readable storage media comprising computer-executable instructions that, when executed on a processor of a computing device, direct the computing device to:
receive a hyperspectral snapshot and a plurality of panchromatic video frames, wherein the hyperspectral snapshot and the plurality of panchromatic video frames correspond to a frame time;
build a plurality of dictionary patches using image data of the plurality of panchromatic video frames at the frame time; and
generate a high-speed hyperspectral (HSHS) video frame based at least in part on the panchromatic video frames, the hyperspectral snapshot, and the plurality of dictionary patches.

14. The one or more computer-readable storage media of claim 13, wherein the instructions for determining the plurality of dictionary patches comprise instructions that, when executed on a processor of a computing device, direct the computing device to: select samples from the panchromatic video frames, individual ones of the samples including data from at least two of the plurality of panchromatic video frames; and
cluster the samples to provide a selected number of the dictionary patches.

15. The one or more computer-readable storage media of claim 13, wherein the instructions for generating the HSHS video frame comprise instructions that, when executed on a processor of a computing device, direct the computing device to determine a representation of at least part of the hyperspectral snapshot and more than one of the plurality of the panchromatic video frames based at least in part on more than one of the plurality of dictionary patches.

16. The one or more computer-readable storage media of claim 13, wherein:
the receiving of the panchromatic video frames include capturing the panchromatic video of a scene using a panchromatic imager, the panchromatic imager capturing data corresponding to a spectral passband at least encompassing the one or more spectral passbands of the hyperspectral imager; and
the receiving of the hyperspectral snapshot includes capturing the hyperspectral snapshot of the scene using a hyperspectral imager, the hyperspectral imager capturing data corresponding to one or more spectral passbands of the hyperspectral imager.

17. The one or more computer-readable storage media of claim 13, the building of the plurality of dictionary patches further comprising:
determining one or more training patches based at least in part on pixel values of one or more pixels of one or more of the plurality of panchromatic frames at the frame time of the hyperspectral snapshot;
assigning the determined one or more training patches to individual ones of a plurality of clusters; and
building the plurality of dictionary patches to include respective dictionary patches for individual ones of the plurality of clusters.

18. The one or more computer-readable storage media of claim 17, wherein the one or more training patches includes samples multiple pixels high and multiple pixels wide taken from at least some of the plurality of panchromatic video frames.

19. The one or more computer-readable storage media of claim 17, wherein the one or more training patches include samples taken from a plurality of consecutive ones of the plurality of panchromatic video frames.

20. The one or more computer-readable storage media of claim 13, the building of the plurality of dictionary patches includes:
determining a plurality of pixel groups, wherein individual ones of the pixel groups include data of multiple pixels associated with one or more regions within inside at least one of the plurality of panchromatic video frames; and
selecting fewer than all of the pixel groups, wherein individual ones of the plurality of dictionary patches include respective ones of the selected pixel groups.

* * * * *